No. 741,871. PATENTED OCT. 20, 1903.
A. A. ANDERSON.
TRANSPORTATION TICKET.
APPLICATION FILED APR. 4, 1902.
NO MODEL. 2 SHEETS—SHEET 1.

EAST BOUND
Conductor's Stub
12   11

| FROM | 00401 | | TO |
|---|---|---|---|
| L'v't's'b'g | 0 | 50 | New Castle |
| L'v't's'b'g | 0 | 50 | New Castle |
| Warren | 5 | 45 | Wash'n R'd |
| Warren | 5 | 45 | Wash'n R'd |
| Niles | 10 | 40 | Edenburg |
| Niles | 10 | 40 | Edenburg |
| Girard | 15 | 35 | Kennedy's |
| Girard | 15 | 35 | Kennedy's |
| Youngstown | 20 | 30 | Lowellville |
| Youngstown | 20 | 30 | Lowellville |
| Struthers | 25 | 25 | Struthers |
| Struthers | 25 | 25 | Struthers |
| Lowellville | 30 | 20 | Youngstown |
| Lowellville | 30 | 20 | Youngstown |
| Kennedy's | 35 | 15 | Girard |
| Kennedy's | 35 | 15 | Girard |
| Edenburg | 40 | 10 | Niles |
| Edenburg | 40 | 10 | Niles |
| Wash'n R'd | 45 | 5 | Warren |
| Wash'n R'd | 45 | 5 | Warren |
| FROM | 8 | 9 | TO |

6   EAST BOUND   7
Passenger's Receipt

Retain this coupon as evidence of payment of fare or until called for by the conductor over

WEST BOUND
Conductor's Stub
12   11

| FROM | 05001 | | TO |
|---|---|---|---|
| New Castle | 0 | 50 | L'v't's'b'g |
| New Castle | 0 | 50 | L'v't's'b'g |
| Wash'n R'd | 5 | 45 | Warren |
| Wash'n R'd | 5 | 45 | Warren |
| Edenburg | 10 | 40 | Niles |
| Edenburg | 10 | 40 | Niles |
| Kennedy's | 15 | 35 | Girard |
| Kennedy's | 15 | 35 | Girard |
| Lowellville | 20 | 30 | Youngstown |
| Lowellville | 20 | 30 | Youngstown |
| Struthers | 25 | 25 | Struthers |
| Struthers | 25 | 25 | Struthers |
| Youngstown | 30 | 20 | Lowellville |
| Youngstown | 30 | 20 | Lowellville |
| Girard | 35 | 15 | Kennedy's |
| Girard | 35 | 15 | Kennedy's |
| Niles | 40 | 10 | Edenburg |
| Niles | 40 | 10 | Edenburg |
| Warren | 45 | 5 | Wash'n R'd |
| Warren | 45 | 5 | Wash'n R'd |
| FROM | 8 | 9 | TO |

6   WEST BOUND   7
Passenger's Receipt

Retain this coupon as evidence of payment of fare or until called for by the conductor over WITNESSES:
Frank A. Fahle
J. A. Walsh

Fig. 1.   Fig. 2.

INVENTOR
Arthur A. Anderson
BY
Bradford & Hood
ATTORNEYS

No. 741,871. PATENTED OCT. 20, 1903.
A. A. ANDERSON.
TRANSPORTATION TICKET.
APPLICATION FILED APR. 4, 1902.
NO MODEL. 2 SHEETS—SHEET 2.

| EAST BOUND | | |
|---|---|---|
| Conductor's Stub | | |
| 12 | | 11 |
| FROM | 00401 | TO |
| L'v't's'b'g | 0 50 | New Castle |
| L'v't's'b'g | 0 50 | New Castle |
| Warren | 5 45 | Wash'n R'd |
| Warren | 5 | |
| Niles | 10 45 | Wash'n R'd |
| Niles | 10 40 | Edenburg |
| Girard | 15 40 | Edenburg |
| Girard | 15 35 | Kennedy's |
| Youngstown | 20 35 | Kennedy's |
| | 30 | Lowellville |

| Youngstown | 20 30 | Lowellville |
|---|---|---|
| Struthers | 25 25 | Struthers |
| Struthers | 25 25 | Struthers |
| Lowellville | 30 20 | Youngstown |
| Lowellville | 30 20 | Youngstown |
| Kennedy's | 35 15 | Girard |
| Kennedy's | 35 15 | Girard |
| Edenburg | 40 10 | Niles |
| Edenburg | 40 10 | Niles |
| Wash'n R'd | 45 5 | Warren |
| Wash'n R'd | 45 5 | Warren |
| FROM | 8 9 | TO |
| 6 EAST BOUND 7 | | |
| Passenger's Receipt. | | |

Retain this coupon as evidence of payment of fare or until called for by the conducter.

over

The passenger receipt portion must be detached in presence of passenger paying fare and be delivered to passenger immediately after fare is collected.
This conductor's stub must be turned in with report and collections.

12—

Any mutilation of this receipt by passenger renders it void.

The stations named next to lines of detachment indicate points between which fare has been paid.
The difference between the figures at points of detachment is the amount paid.

WITNESSES:
Frank A. Lahle
J. A. Walsh

Fig. 3.   Fig. 4.

INVENTOR
Arthur A. Anderson.
BY
Bradford & Hood
ATTORNEYS

No. 741,871.                                                     Patented October 20, 1903.

UNITED STATES PATENT OFFICE.

ARTHUR A. ANDERSON, OF YOUNGSTOWN, OHIO.

TRANSPORTATION-TICKET.

SPECIFICATION forming part of Letters Patent No. 741,871, dated October 20, 1903.

Application filed April 4, 1902. Serial No. 101,304. (No model.)

*To all whom it may concern:*

Be it known that I, ARTHUR A. ANDERSON, a citizen of the United States, residing at Youngstown, in the county of Mahoning and State of Ohio, have invented certain new and useful Improvements in Transportation-Tickets, of which the following is a specification.

In interurban traffic on trolley-lines and the like the passengers pay a cash fare directly to the conductor, and as this amount varies with the distance traveled some sort of a check is necessary which will compel the conductor to turn the entire amount collected over to the company and also to prevent the passenger from riding farther than the distance for which he has paid.

The object of my invention is to produce a ticket therefore on which the names of the several stations along the road are so arranged in conjunction with monetary indicators, if desired, that the conductor may by properly dividing the ticket produce two sections, one of which will be given to the passenger and the other of which will be retained by him, the arrangement of station-names and monetary indicators being such that any mutilation of the conductor's stub after detachment of the passenger's receipt will require from him a greater return in money than the amount received by him from the passenger and any mutilation of the passenger's receipt will result in a shortening instead of a lengthening of the distance to which the passenger would be entitled to travel for the fare paid.

In carrying out my invention I prefer to provide a separate ticket for each direction of travel, the terms "east-bound" and "west-bound" being used herein to designate the two directions of travel, whether those be the actual compass directions or not.

The accompanying drawings illustrate my invention.

Figure 1 is a face view of a ticket embodying my invention particularly designed for use between Leavittsburg and Newcastle through the intermediate stations named. Fig. 2 is a similar view of the west-bound ticket. Fig. 3 is a similar view showing the ticket torn into two sections to indicate a fare from Youngstown to Washington Road, two intermediate stations. Fig. 4 is a view of the back of either ticket.

The middle of each ticket, whether in or out bound, is divided into two parallel longitudinal series 6 and 7, above which appear the words "From" and "To," respectively. In the divisions beneath the word "From" I arrange in duplicate the names of the stations, beginning with that of one terminal and ending with that of the station immediately preceeding the other terminal. Beneath the word "To" I arrange in duplicate the names of the several stations, beginning with the opposite terminal and ending with the station immediately preceding the first terminal, the two series of names thus reading in opposite directions. The two series of names are preferably arranged in transverse alinement and are separated by two vertical series of duplicated monetary-indicator spaces 8 and 9, in which are placed suitable figures, the arrangement being such that the difference between the amount placed opposite any two station-names in the two columns will equal the amount of fare between the said two stations. The west-bound ticket will be similar in arrangement, except that the columns will be interchanged. Suitable wording to indicate the "conductor's stub" and "passenger's receipt" and directions to the conductor and passenger may appear on the face and back of the ticket, as shown; but these directions form no essential element of my invention. A space 11 may be provided for the usual consecutive number usually found on tickets, and the ticket is preferably ruled transversely between the station-names and is perforated on a vertical line 12 between the two rows of spaces 8 and 9.

In use suppose a passenger entrains at Youngstown and informs the conductor that he desires to go to Washington Road. The conductor thereupon by means of a usual tearing-strip (not shown) tears the ticket transversely upon the line between the two names "Youngstown" in the "From" column and also transversely between the two names "Wash'n Road" in the "To" column and separates the ticket on the perforated line 12 between these two lines. The conductor then collects the difference between "45,"

which is opposite "Wash'n Road," and "20," which is opposite "Youngstown," the fare collected being twenty-five cents. The ticket is thus torn into two sections, one of which the conductor keeps and the other of which is handed to the passenger and is subject to inspection by the conductor at any time during the trip. The lower end of the conductor's stub shows at the bottom of the right-hand side "45 Wash'n Road" and at the bottom of the left-hand side "Youngstown 20," and in turning in this stub he is required to pay the difference between the amounts indicated. If he should tear a section from either or both columns, the difference would be increased, and he would be compelled to pay a greater amount than he had received. This operates as an absolute check against any alteration of the stub by the conductor. In like manner the upper end of the left-hand column of the passenger's receipt shows "Youngstown 20" and the upper end of the right-hand column shows "45 Wash'n Road," the difference, twenty-five cents, being the amount paid. If a section be thereafter torn from the upper end of either column, the result would be to shorten the ride to which he would be entitled.

I claim as my invention—

1. A transportation-ticket bearing two sets of the same station-names, the names in each set being duplicated, one set beginning at one end of the line and the other set beginning at the opposite end of the line.

2. A transportation-ticket bearing two sets of the same station-names, the names in each set being duplicated, one set beginning at one end of the line and the other set beginning at the opposite end of the line, and monetary-indicator amounts also duplicated and arranged in conjunction with the station-names.

3. A transportation-ticket having arranged on its face two adjacent parallel columns each consisting of duplicated station-names those in one set being the same as those in the other set, one set beginning at one end of the line and the other set beginning at the opposite end of the line.

4. A transportation-ticket having arranged on its face two adjacent parallel columns each consisting of duplicated station-names those in one set being the same as those in the other set, one set beginning at one end of the line and the other set beginning at the opposite end of the line, and duplicated monetary indicators inscribed opposite each pair of names.

5. A transportation-ticket having arranged on its face two parallel columns each containing station-names of the same line, the names in one column being in duplicate and beginning at one end of the line and ending with the next to the last station at the opposite end of the line, while the names in the other column are in duplicate and begin at the opposite end of the line and end with the first station out from the first end of the line, and monetary indicators in duplicate inscribed opposite each pair of names.

In witness whereof I have hereunto set my hand and seal at Indianapolis, Indiana, this 29th day of March, A. D. 1902.

ARTHUR A. ANDERSON. [L. S.]

Witnesses:
ARTHUR M. HOOD,
FRANK A. FAHLE.